Feb. 21, 1928. 1,659,987

E. J. BENSON ET AL

APPARATUS FOR FORMING PLASTIC BUILDING BLOCKS

Filed May 23, 1925 11 Sheets-Sheet 1

INVENTORS
ERNEST J. BENSON
CARL F. WESTBERG
CARL W. FERNHOLTZ
EMIL FERNHOLTZ

ATTORNEY

Feb. 21, 1928.                                                1,659,987
                    E. J. BENSON ET AL
          APPARATUS FOR FORMING PLASTIC BUILDING BLOCKS
                  Filed May 23, 1925        11 Sheets-Sheet 2
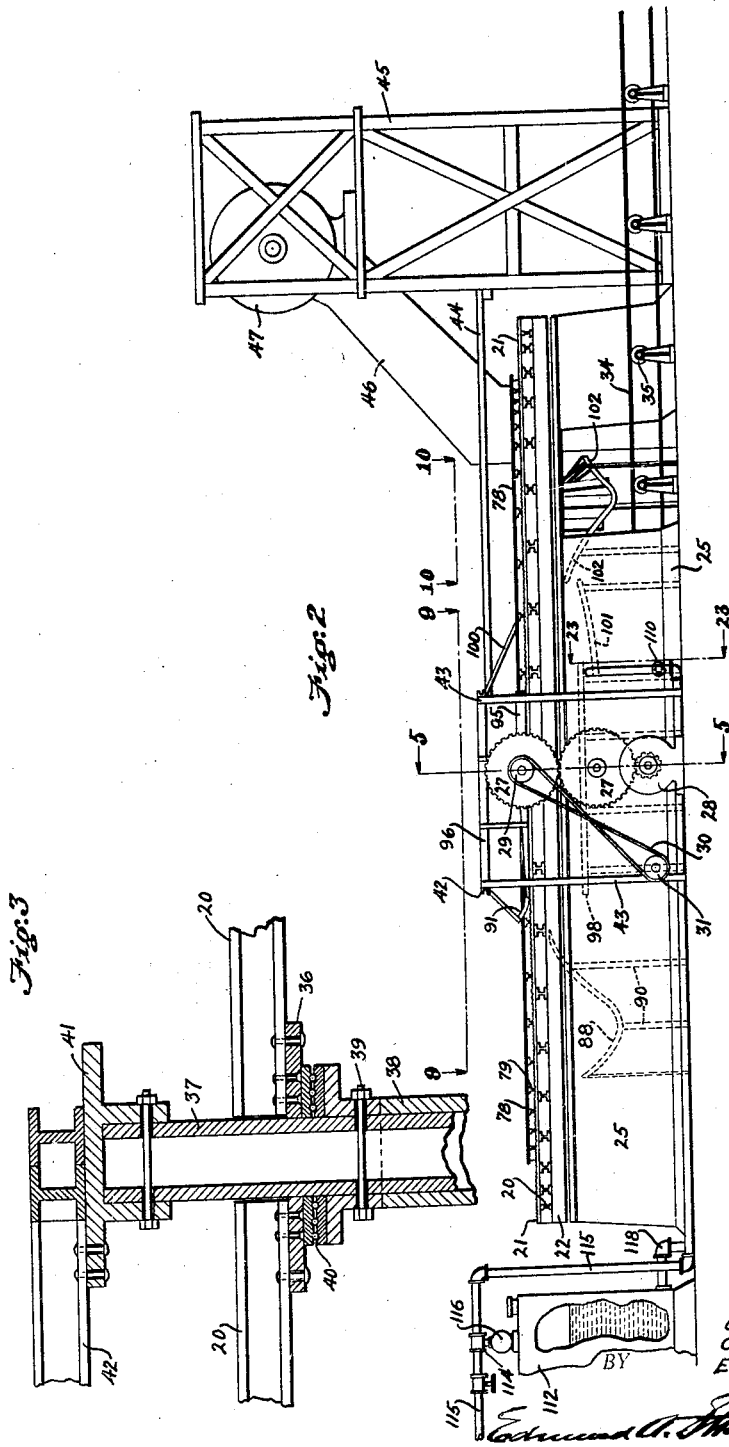
INVENTORS
ERNEST J. BENSON
CARL F. WESTBERG
CARL W. FERNHOLTZ
EMIL FERNHOLTZ
BY
ATTORNEY.

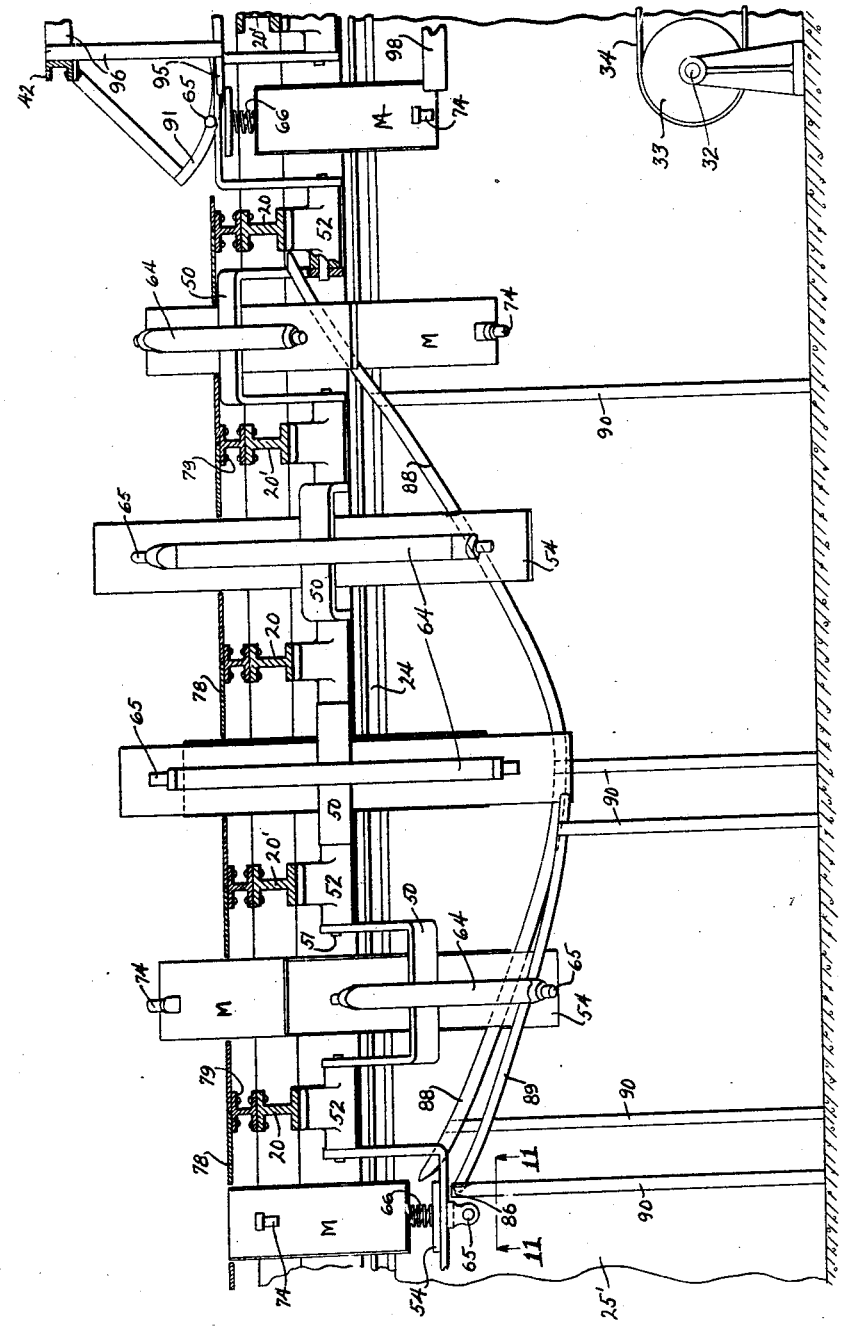

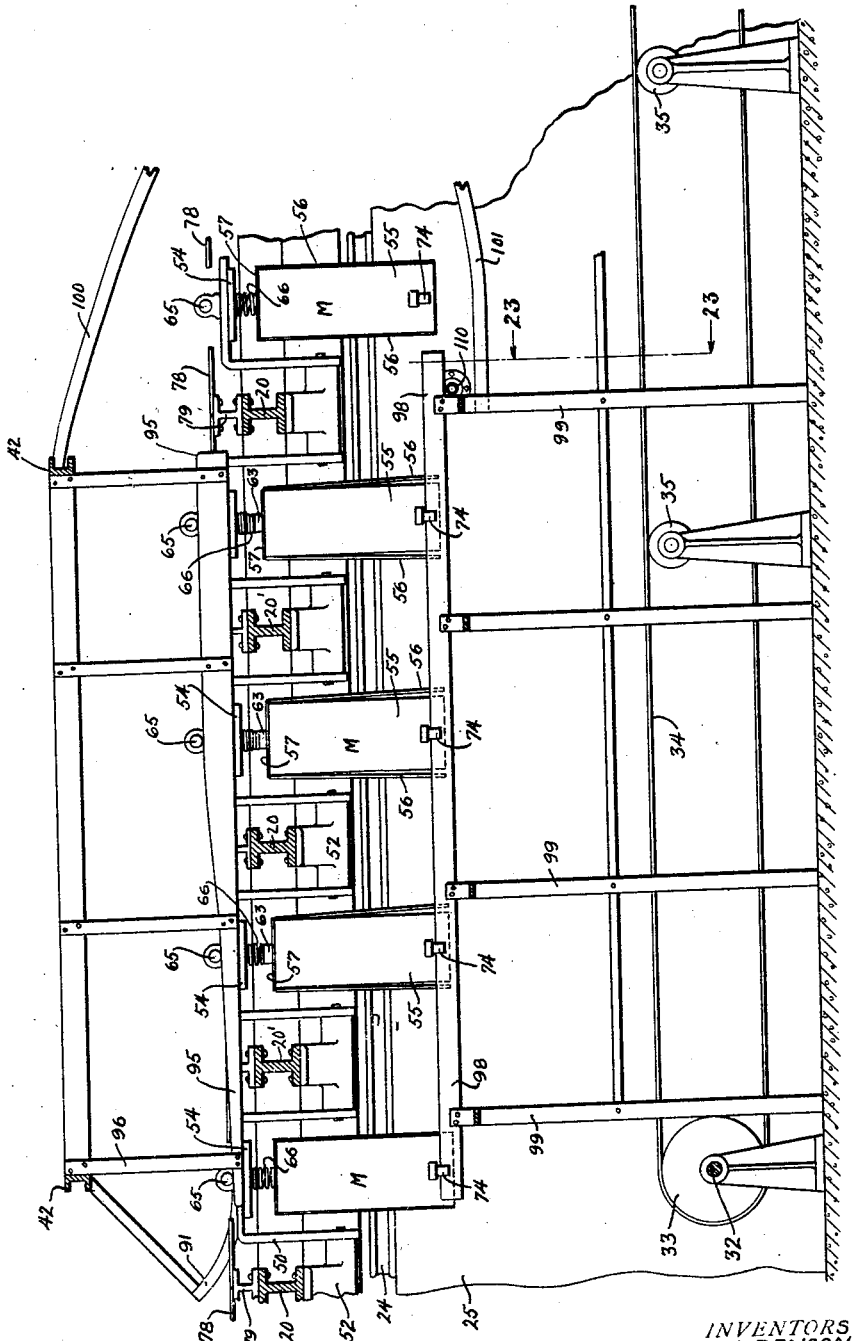

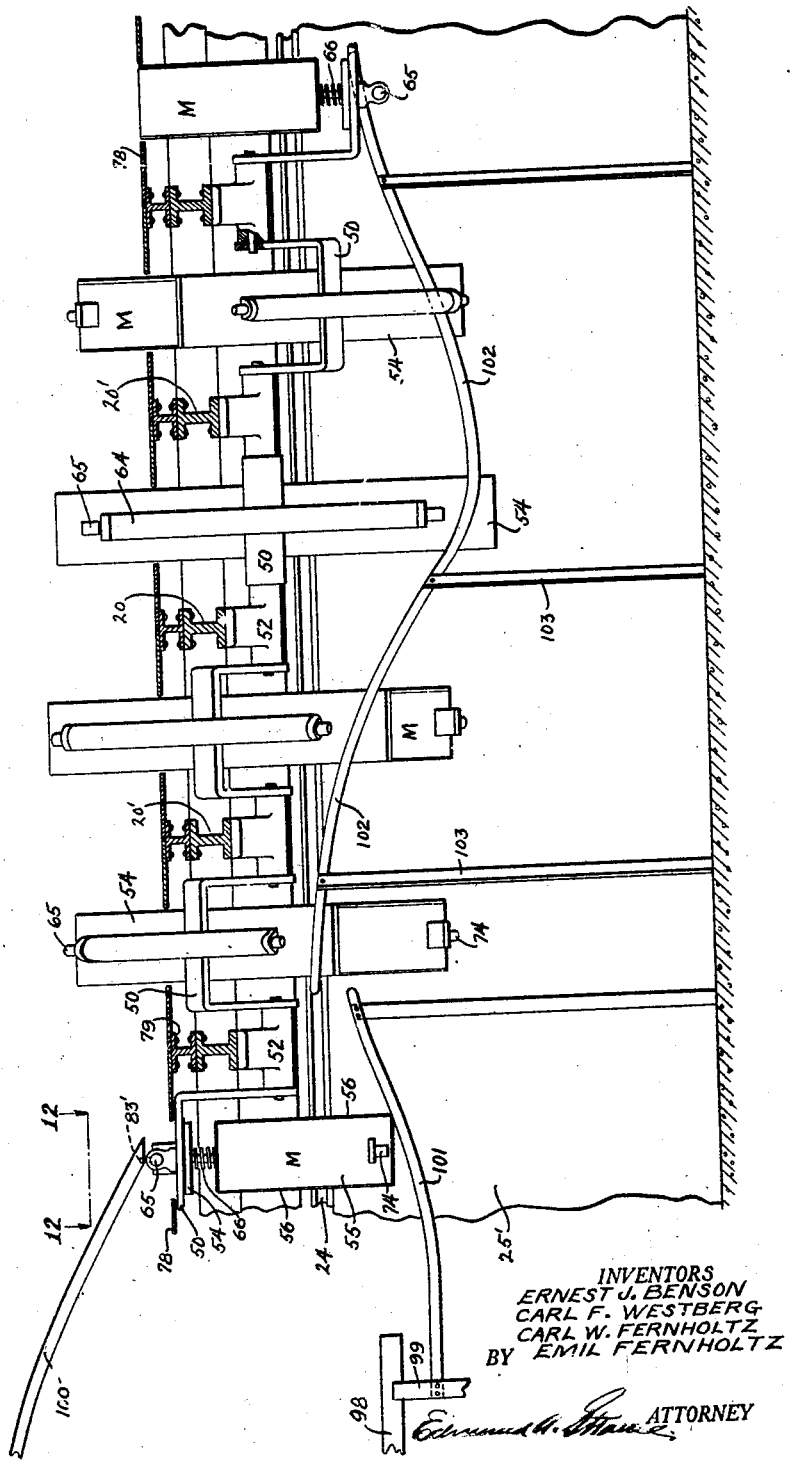

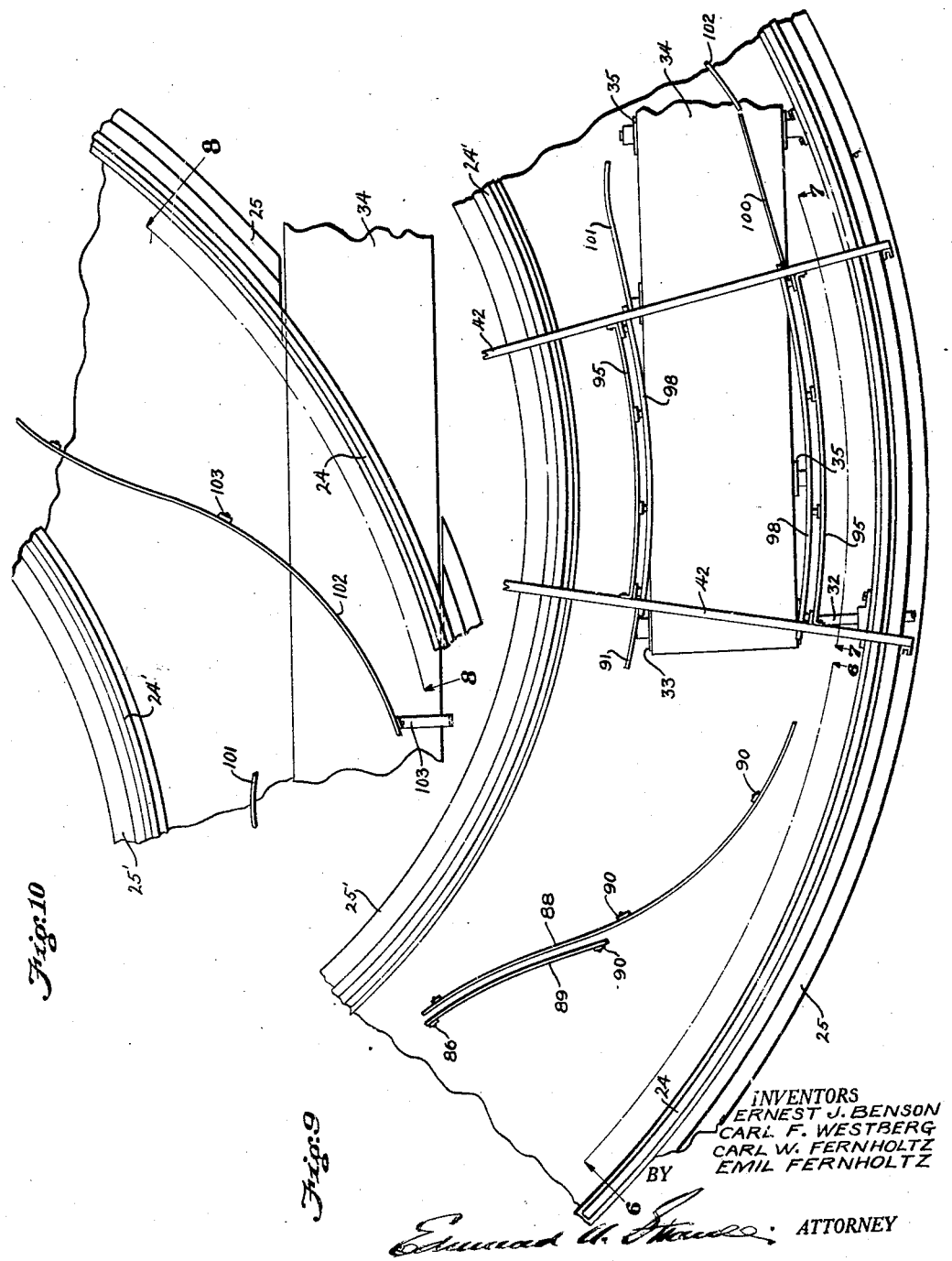

Feb. 21, 1928.　1,659,987
E. J. BENSON ET AL
APPARATUS FOR FORMING PLASTIC BUILDING BLOCKS
Filed May 23, 1925　11 Sheets-Sheet 8
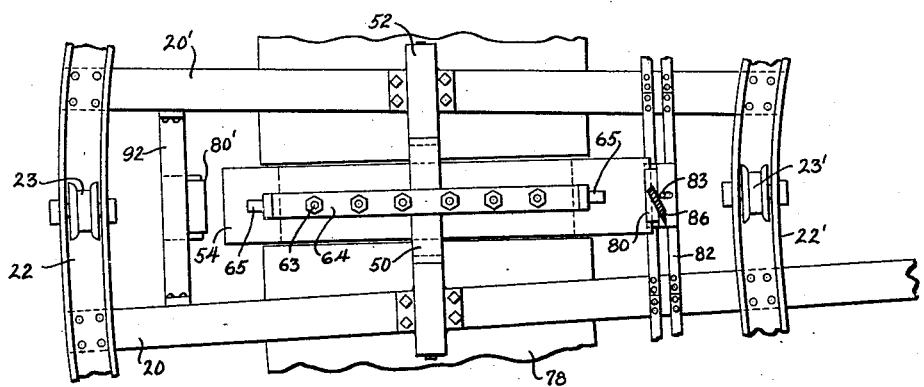
*Fig. 11*
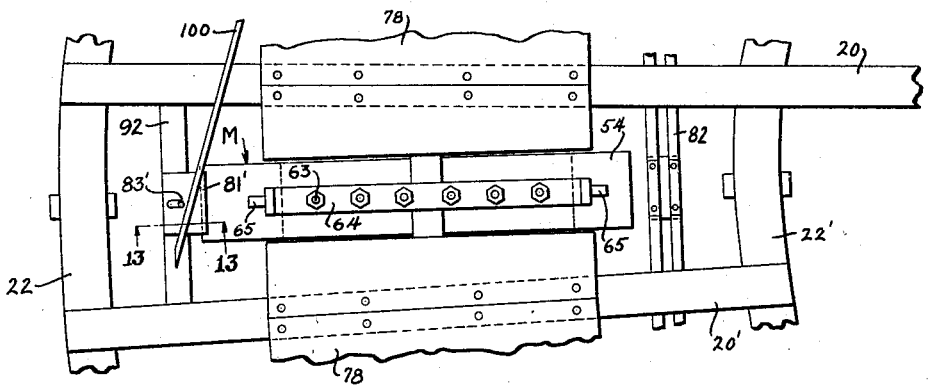
*Fig. 12*
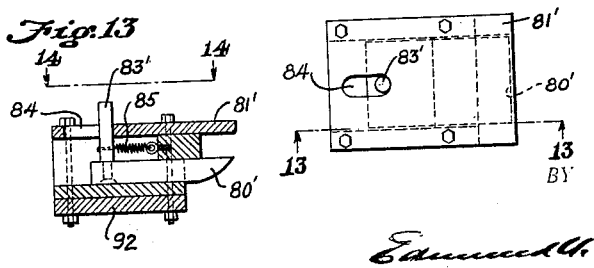
*Fig. 13*　*Fig. 14*
INVENTORS
ERNEST J. BENSON
CARL F. WESTBERG
CARL W. FERNHOLTZ
EMIL FERNHOLTZ
BY
ATTORNEY.

Feb. 21, 1928.
E. J. BENSON ET AL
1,659,987
APPARATUS FOR FORMING PLASTIC BUILDING BLOCKS
Filed May 23, 1925      11 Sheets-Sheet 9
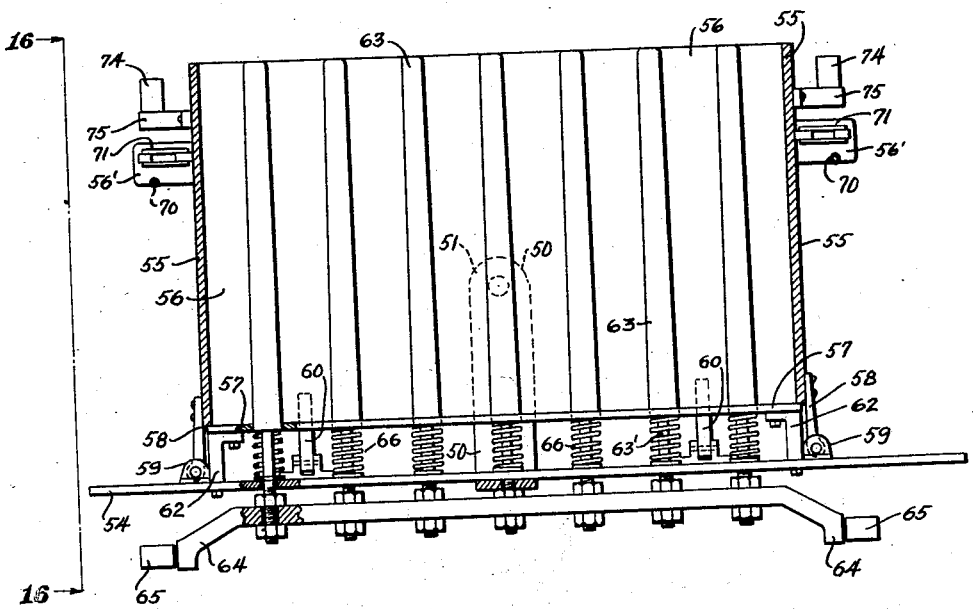
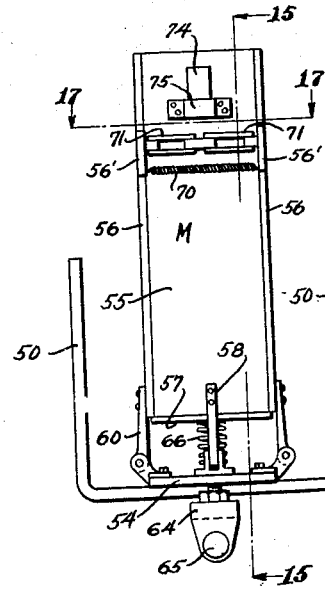
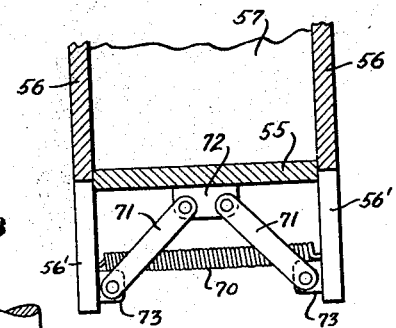
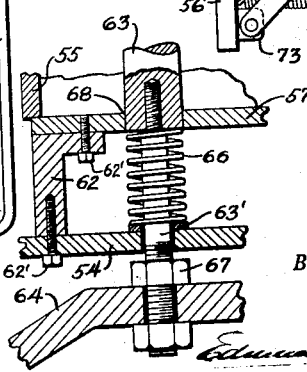
INVENTOR
ERNEST J. BENSON
CARL F. WESTBERG
CARL W. FERNHOLTZ
BY   EMIL FERNHOLTZ
ATTORNEY Feb. 21, 1928.
E. J. BENSON ET AL
1,659,987
APPARATUS FOR FORMING PLASTIC BUILDING BLOCKS
Filed May 23, 1925     11 Sheets-Sheet 10
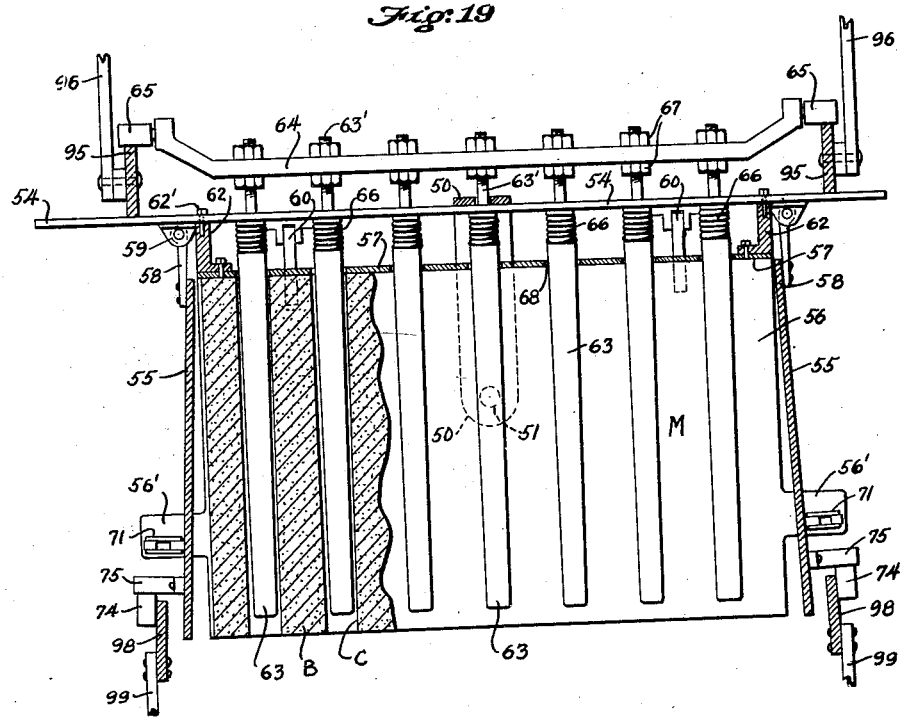
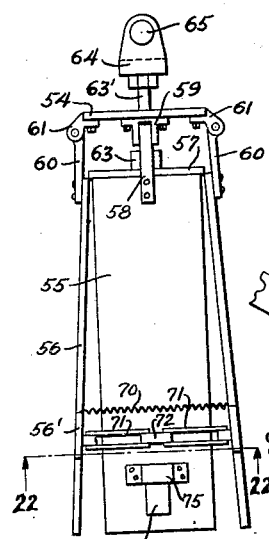
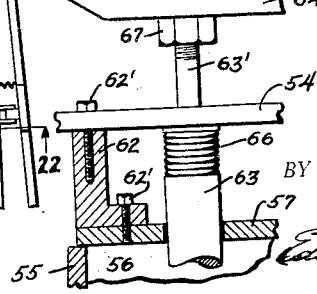
INVENTORS
ERNEST J. BENSON
CARL F. WESTBERG
CARL W. FERNHOLTZ
EMIL FERNHOLTZ
BY
ATTORNEY.

Feb. 21, 1928.

E. J. BENSON ET AL 1,659,987

APPARATUS FOR FORMING PLASTIC BUILDING BLOCKS

Filed May 23, 1925    11 Sheets-Sheet 11

INVENTORS
ERNEST J. BENSON
CARL F. WESTBERG
CARL W. FERNHOLTZ
EMIL FERNHOLTZ

BY

ATTORNEY.

Patented Feb. 21, 1928.

1,659,987

UNITED STATES PATENT OFFICE.

ERNEST J. BENSON, CARL F. WESTBERG, CARL W. FERNHOLTZ, AND EMIL FERNHOLTZ, OF LOS ANGELES, CALIFORNIA.

APPARATUS FOR FORMING PLASTIC BUILDING BLOCKS.

Application filed May 23, 1925. Serial No. 32,330.

An important object of the invention is to provide apparatus for molding building blocks from plastic materials, such as gypsum compositions, by means of which apparatus all of the various operations from the filling of the molds to the final ejection of the molded blocks shall be carried on both continuously and automatically, thereby producing such blocks in a highly efficient and rapid manner.

Another object is to provide apparatus having means for automatically supplying semi-fluid plastic material to the molds during operation.

An additional object is to provide a plurality of expansible or separable molds which will automatically release and readily discharge the molded blocks therefrom after said blocks have "set" sufficiently.

A further object is to provide a plurality of block-molding forms each of which has means, such as a plurality of core members, adapted to form air cavities or channels for the purpose of lightening the structure and for improving the insulating qualities thereof.

And a still further object is to provide in such a block-molding machine lubricating mechanism adapted to apply lubricant automatically to the interior walls of the mold forms prior to introduction of the plastic materials thereto, for the purpose of preventing adherence of the molded blocks to the mold walls when the same are expanded for discharge of the blocks.

Briefly, the invention comprises a continuously rotary carrier in which there is mounted a plurality of expansible molds, adapted to be inverted for discharge of the molded blocks therefrom. The carrier passes beneath a hopper for filling the molds, the discharge throat of the hopper being closed during the intervals between presentation of successive molds by means of plates which are provided on the carrier and fill the spaces between the molds. The carrier rotates at a rate of speed slow enough to allow the plastic materials to set in the molds sufficiently for handling the purposes, whereupon the molds are brought into engagement with cams which invert the same. The walls of the molds are then engaged by a second set of cams which expand or separate said walls for discharge of the molded blocks and also withdraw from the blocks sets of cavity-forming cores. While the walls are still expanded they are submitted to the action of a spray of lubricant to prepare them for the next charge of plastic material for the purpose of preventing adherence of the resulting molded blocks. After the walls are released by the second set of cams, the molds are brought under the influence of a third set of cams which serve to right the molds for reception of the next charge of block forming material. The side and end walls of each mold are pivoted on a supporting and positioning plate, which the bottom is fixedly carried thereon. A plurality of spring controlled cores project through the bottom into the mold for the purpose of forming air cavities or channels in the resulting block, these cores being mounted on a withdrawing bar which is cam operated as above indicated for withdrawal of the cores simultaneously with expansion of the walls when the mold releases the block, the springs being tensioned at the same time. The springs are released suddenly, thereby causing the cores to snap back into normal position and produce a jar or jolt which serves effectually to dislodge any block which may not have been discharged. This action takes place just prior to spraying with lubricant, and immediately following the lubricant spray the side and end walls are released whereupon spring and toggle connections return said walls to normal position, preparatory to righting the mold.

The invention resides further in the various combinations and arrangements of parts and in the features of construction illustrated in the accompanying drawings, described herein and pointed out in the claims hereunto annexed, it being understood that this disclosure is to be regarded as descriptive only and not as restrictive of the invention, of which obviously many embodiments may be constructed including many minor modifications without departing from the general scope of the invention as herein indicated and claimed.

In the drawings wherein certain embodiments of the invention are disclosed by way of example:

Fig. 2 is an elevation taken from the left of Fig. 1;

Fig. 3 is a vertical sectional detail of the center mounting taken approximately on the line 3—3 of Fig. 1;

Fig. 6 is chiefly an elevational detail taken approximately from the position indicated by the lines 6—6 of Figs. 1 and 9 showing the cam mechanism for inverting the molds;

Fig. 7 is a similar view taken approximately from the position indicated by the lines 7—7 of Figs. 1 and 9 showing the cam mechanism for expanding or separating the mold parts for discharge of the blocks, and indicating the release to jar loose any block which may have adhered;

Fig. 8 is a similar view taken approximately from the position indicated by the lines 8—8 of Figs. 1 and 10 showing the cam mechanism for righting the molds;

Fig. 9 is a diagrammatic plan showing only the cam mechanism for inverting the molds and expanding the same, the position being indicated by the lines 9—9 of Fig. 2;

Fig. 10 is a similar view of the cam mechanism for righting the molds, the position being indicated by the line 10—10 of Fig. 2;

Fig. 11 is a bottom plan view of an upright mold in position for release of a retaining latch therefor preparatory to the inverting operation, this view being taken from the position indicated by line 11—11 of Fig. 6;

Fig. 12 is a top plan view of an inverted mold in position for release of a second retaining latch therefor preparatory to righting the mold, this view being taken from the position indicated by the line 12—12 of Fig. 8;

Fig. 13 is a cross sectional view through the latch of Fig. 12 taken on the lines 13—13 of Figs. 12 and 14;

Fig. 14 is a plan view thereof taken from the line 14—14 of Fig. 13;

Fig. 15 is a longitudinal vertical section of one of the molds per se taken on the line 15—15 of Fig. 16;

Fig. 16 is an end elevation thereof taken from line 16—16 of Fig. 15;

Fig. 17 is a fragmentary sectional detail taken on line 17—17 of Fig. 16;

Fig. 18 is an enlarged sectional detail of the core mounting;

Fig. 19 is a longitudinal vertical section of an inverted expanded mold ready to discharge a block;

Fig. 20 is an enlarged detail showing the core position when the mold is inverted;

Fig. 21 is an end elevation of an inverted expanded mold;

Fig. 22 is a sectional detail taken on the line 22—22 of Fig. 21;

Figure 23:
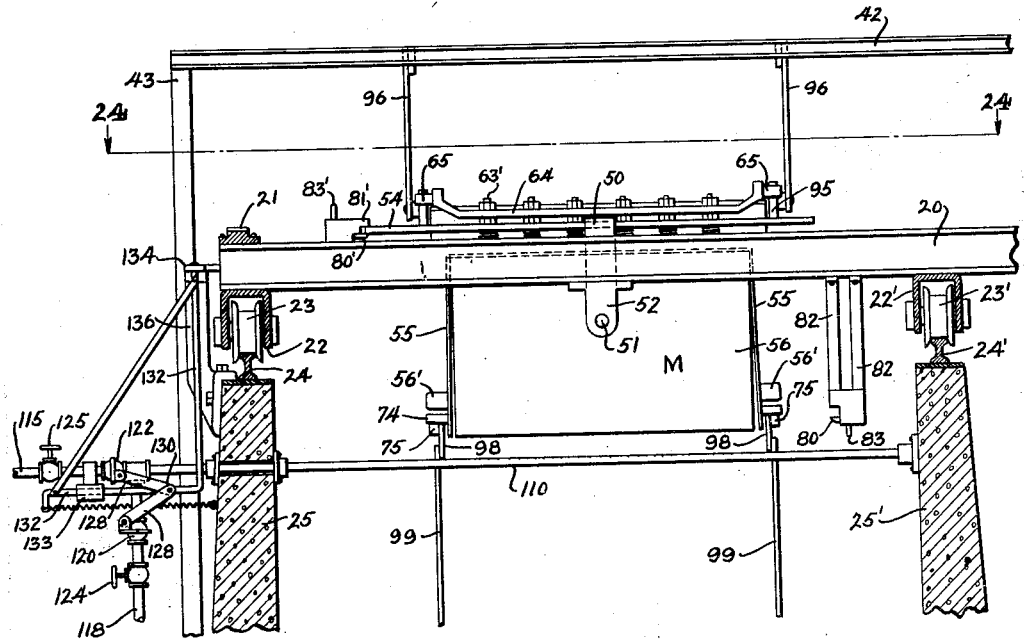
Figure 24:
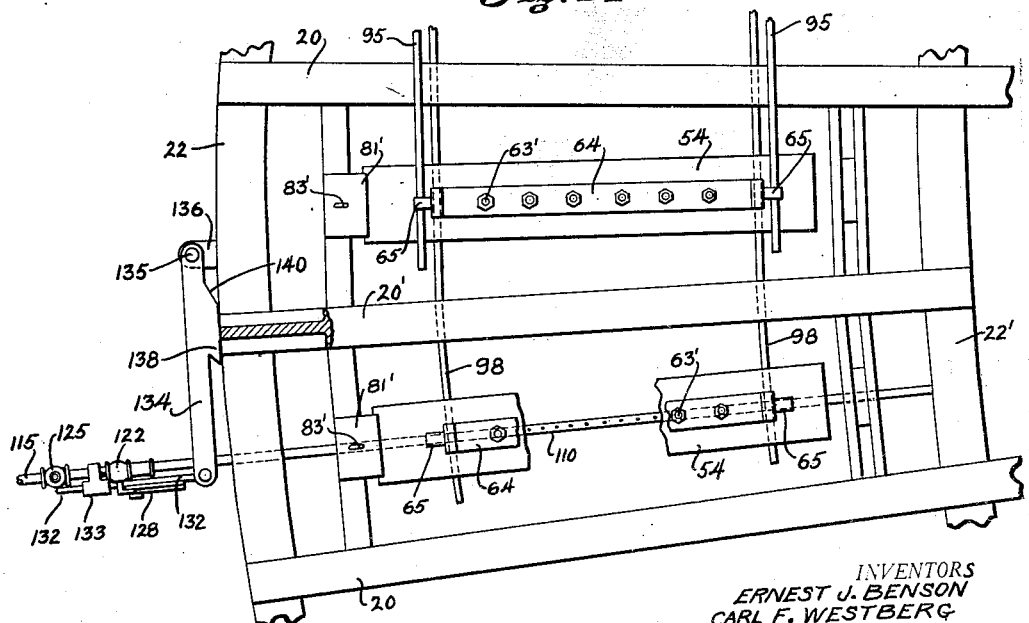

Fig. 23 is a vertical transverse section taken on the lines 23—23 of Figs. 2 and 7 showing the means for spraying the insides of the inverted molds with lubricant; and Fig. 24 is chiefly a plan view thereof as indicated by line 24—24 of Fig. 23.

The rotary carrier which supports and advances the molds M comprises a plurality of radially disposed arms 20 in the form of I-beams extending from a center, the upper sides of these arms 20 carrying at their outer ends an annular rack 21, while the under sides of said arms are supported upon and connected by an annular channel 22 in which are mounted rollers 23 traveling upon a circular track 24 mounted upon a suitable foundation 25. Between the outer portions of the arms 20 short arms 20' are disposed, the outer ends of which are connected with the rack 21 and the channel 22, while the inner ends thereof are mounted upon an annular channel 22' which also supports the arms 20 and carries rollers 23' running upon a circular track 24' carried upon a foundation 25' and concentric with the track 25.

The rotary carrier thus formed is driven by a pinion 26 which engages the rack 21 and is in turn driven through a gear train 27 from a motor 28 or other prime mover. The shaft which carries the pinion 26 also carries a pulley 29 over which there passes a belt 30 which drives a pulley 31 on the end of a shaft 32 driving a roller 33 for moving a take-off belt 34 receiving blocks discharged from the inverted molds M, the upper run of the belt being supported on rollers 35.

Figure 1:
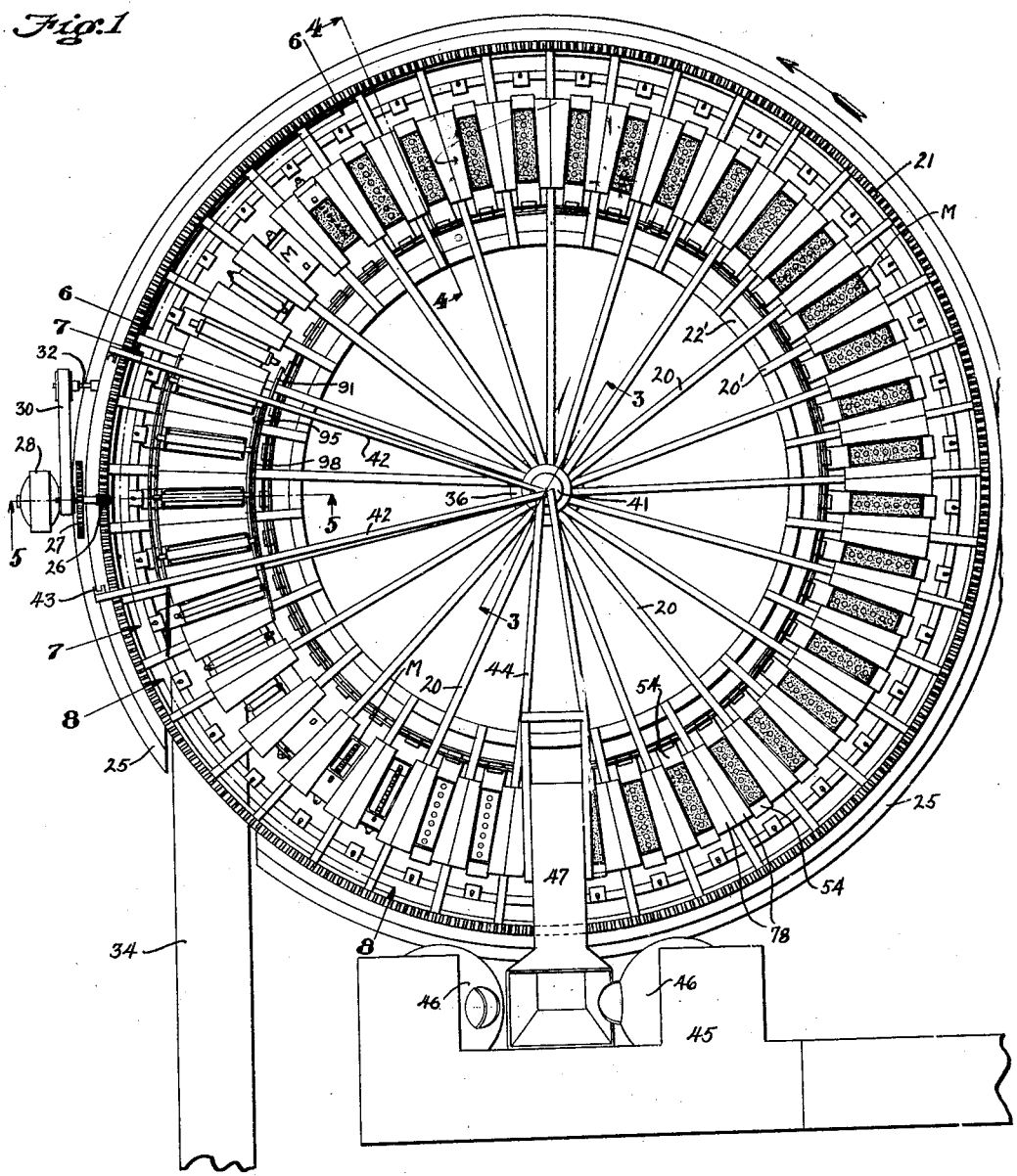
Fig. 1 is a plan view of the complete apparatus.

The inner ends of the arms 20 are secured to a collar 36 rotating about a pivoting standard 37 carried in a member 38 and secured thereto at 39, a suitable ball bearing 40 or the like being employed for rotary support of the collar 36 upon the flanged upper end of the member 38. The standard 37 is capped at 41 and supports the inner ends of a pair of beams 42 which extend radially to the left in Fig. 1 and connect with upright posts 43 (Figs. 1, 2 and 5) for support of the expanding cam structure hereinafter described. Also extending radially from the cap 41 are beams 44 which connect at their outer ends (Fig. 2) with a tower 45 which supports a pair of mixing devices 46 which feed plastic materials into a hopper and chute 47 whence they are charged into the molds M traveling therebeneath on the carrier 20.

Each of the molds M is supported upon a U-shaped stirrup 50 whose ends are pivoted at 51 in brackets 52 carried on the under sides of the arms 20 and 20' which permit the mold to be swung in a vertical plane radially disposed between said arms. Each stirrup 50 has its middle portion secured to and across the under side of the middle of a positioning and supporting plate 54 which extends radially of the carrier, and it is primarily this plate which supports the mold and through which the mold is moved into its various positions. Each mold proper comprises end walls 55, side walls 56, and a bottom 57. The ends 55 are provided with links 58 by means of which they are pivotally connected with brackets 61 and thereby also connected with the supporting plate 54. The bottom 57 of each mold M has a plurality of slightly tapered movable cores 63 projecting therethrough, the body portions of said cores being positioned within the molds for the purpose of forming air channels or cavities C in the blocks B being molded which serve both to lighten the structure and to provide better insulating qualities. The outer portions of the cores 63 are reduced in size to form stems 63' which project through the supporting plate 54 and into a withdrawing bar 64 which extends longitudinally of the plate 54 and has its ends offset downward and provided with rollers 65 for engagement with cam tracks for withdrawing the cores 63 as hereinafter described. Said stems 63' are secured in the bar 64 as by means of nuts 67, while coil springs 66 are disposed therearound and engage the bar 64 and the shoulders of the cores 63 proper. In this manner the springs 66 tend to urge the cores 63 into the mold through the bottom 57 and away from the plate 54 while at the same time drawing the bar 64 toward said plate 54.

Figure 5:
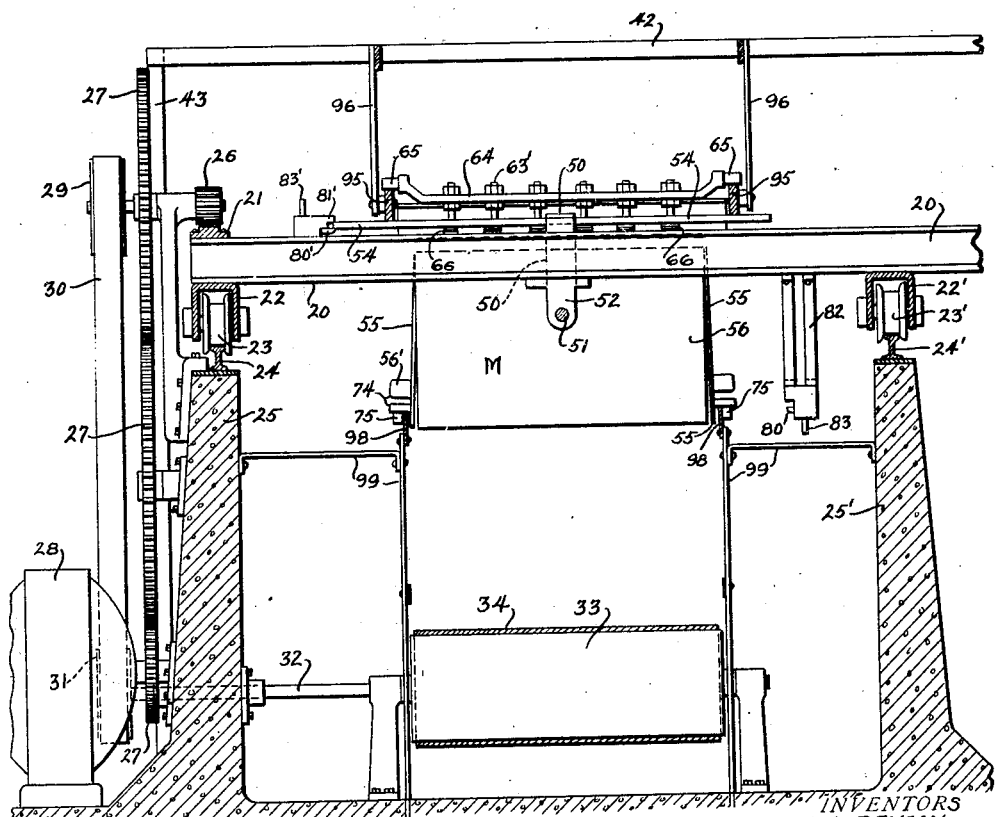
Fig. 5 is a transverse section taken on the lines 5—5 of Figs. 1 and 2 showing a mold in inverted expanded position for discharge of a set block.

The mold M is shown in its expanded position in Figs. 5, 19 and 21 ready for discharge of the block B, but when in the normal position shown in Figs. 15, 16 and 17, the springs 66 are free to force the cores 63 through the bottom 57 into the mold and to urge the bar 64 toward the positioning and supporting plate 54. In this position said walls 55 and 56 are drawn and held together by means of contracting springs 70 whose ends are connected with ears 56' on the sides 56 and thereby directly cause said side walls 56 to approach each other, while the end walls 55 are forced inward under influence of the same springs 70 through the medium of links 71 pivoted to the ends 55 by means of ears 72 and to the side walls 56, by means of ears 73. For the purpose of separating said walls 55 and 56, the ends 55 are provided externally with rollers 74 mounted upon offsets 75, said rollers being cam actuated as hereinafter described.

When the molds M are in operative position on the carrier 20 to receive plastic material from the hopper 47, the upper edges of their side and end walls 56 and 55 are flush with the upper surfaces of plates 78 which are supported upon bars or beams 59 on arms 20 and 20'. The plates 78 extend radially of the carrier and fill the spaces between the molds M so that they serve to close the hopper 47 or that portion thereof which is not discharging plastic material into the molds M to prevent loss of said material. Thus as the molds M are rotated beneath the hopper 47 they are filled with plastic material which gradually sets as the molds are carried around the circle described by the carrier in its rotation. The operation is timed according to the plastic material used, so that when the molds have traveled 180° or a little more, the blocks will have set sufficiently to permit discharge thereof upon the belt 34.

During travel to this discharge point, each mold is held in upright position by means of a latch 80 carried in a casing having an overhanging shoulder 81, between which latch 80 and shoulder 80 one end of the positioning plate 54 is held, the plate being positively held to prevent rotation of the mold and stirrup 50 about the pivots 51, through the medium of brackets or other supporting devices 82 depending from the arms 20 and 20'. The latch 80 is operable for withdrawl of the same from engaging position through the means of a projecting pin 83. This device is similar in all essential features to the latch shown in Figs. 13 and 14, wherein the moving latch bolt 80' cooperates with an overhanging ledge or shoulder 81' of a casing to engage the end of the plate 54 when the mold is in inverted position. This last mentioned latch 80' has a pin 83' projecting through a slot 84 for actuation of the latch, said pin and latch being under the influence of a spring 85, as is the latch 80.

When a mold M reaches the discharge position, the latch pin 83 moves into the path of an upstanding release finger 86 (Figs. 6 and 11) which withdraws said latch 80 to release the plate 54, whose ends it will be noted extend beyond the end walls 55 of the mold form. The released end of plate 54 passes immediately under the end of a cam rail 88 and above the end of a guide rail 89 (Figs. 6 and 9) which rails are conveniently supported on legs 90. The cam 88 is depressed so that as the end of plate 54 follows under the same the mold M is upended gradually, as seen in Fig. 6. As the cam 88 extends to the opposite side it rises so as to carry the end of the plate 54 upward on the other side of the line of pivot of the stirrup 50 thus causing the mold to be completely inverted. The mold now passes beyond the control of the cam 88, and to insure that it has been completely inverted one end of plate 54 passes under a depressing arm 91 which makes certain that the opposite end of the plate snaps under the latch 80' (as best seen in Fig. 5) carried on a cross bar 92 (Figs. 11 and 12)

whereby the mold is positively held in fully inverted position.

The mold now comes into the range of influence of the expanding cams, and inasmuch as the positioning plate 54 is fixed on the stirrup 50, the position of said plate is also fixed. For the purpose of steadying both ends of the plate 54, said ends pass under opposite cam rails 95 supported on framework 96 (Fig. 7) carried by the arms 42. At the same time the rollers 65 on the ends of the withdrawing bar 64 ride up on the upper edges of the cam rails 95 which gradually widen (Fig. 7,) and thereby lift the bar 64 and cores 63 and compress the springs 66 against the positioned plate 54 as best seen in Figs. 7 and 19. During this operation, the rollers 74 on the opposite end walls 55 engage the outer faces of cam rails 98 (Figs. 7, 9 and 19) supported at 99, thereby separating said ends 55 and at the same time through the toggle connection 71 separating the side walls 56 against the influence of the springs 70 (Fig. 20). This ordinarily frees the mold parts from the block B therein, since the parts are withdrawn as shown in Fig. 19, and the block B drops upon the belt 34 below (Fig. 7). However, in case the block B should adhere to the bottom 57 or other part, the cam rails 95 are terminated suddenly and are also made shorter than the cam rails 98, so that while the walls 55 and 56 are still expanded the rollers 65 suddenly drop from the rails 95 allowing the springs to expand suddenly and likewise suddenly return the bar 64 and cores 63. This action results in a jolt or jar upon plate 54 and by way of brackets to bottom 57 which is ample to dislodge any block which may have adhered. When the rollers 74 leave the cam rails 98, the sides 55 and 56 assume the normal position shown in Figs. 15, 16 and 17, and the mold is ready to be righted.

Figure 4:
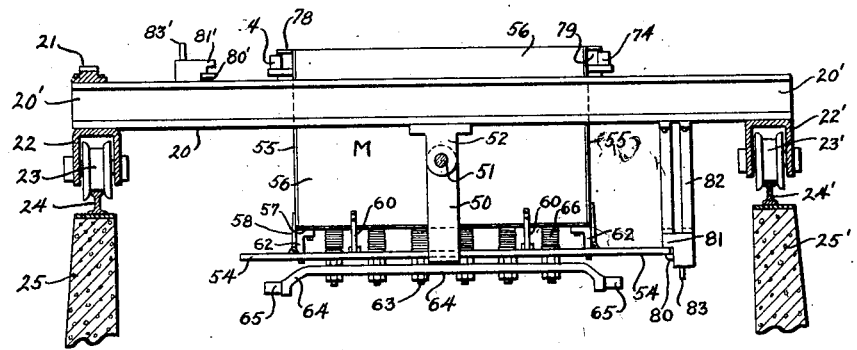
Fig. 4 is a transverse sectional detail taken on the lines 4—4 of Fig. 1 showing a mold in upright position.

The mold now passes along in inverted position to bring the projecting pin 83 of the latch 80′ (Figs. 8 and 12) into the path of a latch release 100 which retracts the latch 80′ and frees the plate 54. A corner of the mold immediately comes into engagement with a rail 101 which starts the mold to swing or tip and brings an end of the plate 54 under a cam rail 102 supported at 103 (Figs. 8 and 10) which rights the mold M and restores it to normal position, the end of said cam 102 forcing the end of plate 54 into engagement with the latch 80 (Fig. 4) as said plate leaves said cam end. Thus the mold is ready to receive another charge of plastic material from hopper 47.

In actual operation of the structure, it is necessary that the inner faces of the mold walls be treated with lubricant to eliminate as far as possible any tendency of the set blocks to stick to said walls or cores when the molds are inverted and expanded for discharge of the blocks. For this purpose a perforated spray pipe 110 is provided below the path of the inverted molds for applying atomized oil or the like to said inner faces and the cores while the walls 55 and 56 are still expanded. Said pipe 110 is located just below the ends of the cam tracks 98 (as best seen in Figs. 2, 7 and 24) so that the molds will be sprayed interiorly after the cores have been released by the cam tracks 95 for return to normal position within the molds, and before the rollers 74 have been released to permit return of walls 55 and 56. Treatment at this point allows any excess oil to drip off, and by the time the molds have been righted and brought again to position under the hopper 47 thoroughly lubricated surfaces are presented to the fresh charge of composition.

The lubricant to be sprayed in atomized form from the spray pipe 110 is supplied from a tank 112 (Fig. 2) which is under air pressure through a connection 114 from an air line 115, a pressure regulator 116 being provided in said connection 114. Oil under pressure is received from the tank 112 by a line 118 which extends forward to an oil feeding valve 120 (Fig. 23) while a continuation of the air line 115 extends forward to an air feeding valve 122, said valves 120 and 122 being automatically actuated for supplying the spray pipe 110. For the purpose of regulating the flow to the oil and air valves 120 and 122, the respective lines may be provided with valves 124 and 125 which may also serve as cut-off valves. Said feed valves 120 and 122 are adapted for automatic actuation by levers or links 128 pivoted at 130 to the lower cross bar of a triangular frame 132 reciprocable in an elongated guide and under the influence of a returning spring 133. The upper end of the frame 132 is mounted in the free end of a trigger 134 whose opposite end is pivoted at 135 to a bracket 136 fixed on the foundation 25, and the inner side of the trigger is provided with a laterally offset shoulder 138 having a beveled edge 140 adapted to be engaged by the web of each I-beam of the passing arms 20 and 20′. Actuation of the trigger 134 moves the frame 132 sufficiently to operate the valves 120 and 122 for supplying the pipe 110 with oil and air, the oil being atomized as it leaves the perforations in said pipe and thoroughly spraying the inner walls of each passing mold.

From the foregoing it will be clear that molded blocks B are continuously formed and discharged upon the belt 34. The molds M pass successively under the hopper 47 and are charged with plastic material plates 78 preventing any loss between the molds. As said molds reach the discharging position, their latches 80 are successively released by the release finger 86, whereupon the ends of the plates 54 pass under the cam rails 88 and the molds are inverted, the plates being latched in inverted position by latches 80′. The cam rails 95 then act to withdraw the cores 63 and tension the springs 66, while the cams 98 separate the end and side walls 55 and 56 to discharge the blocks upon the belt 34. In the event that a block should fail to drop, the sudden jar imparted by sudden expansion of the springs 66 when the rollers 65 leave the cam rails 95 effectually dislodges the block. While the side walls are still held expanded by the cam tracks 98, the trigger 134 is actuated as each mold passes to spray lubricant upon the inner faces of the mold walls through spray pipe 110, whereupon cams 98 release said wells for return to normal positions. The plates 54 are then released by latches 80′ through the action of a latch-release 100, and rail 101 starts return of the molds to normal position, the cam 102 then engaging the ends of plates 54 and completing return to said normal upright position.

It will also be seen that a rapid and efficient automatic block molding machine has been produced, which will effectually cut down operating costs and lower cost of production. More than seventy-five per cent of the molds are in operation at all times, and this percentage may be increased by increasing the number of molds; and since operation is continuous the output per unit of time is very large.

What we claim is:

1. In a device of the character disclosed, in combination an endless rotary carrier, expansible molds mounted to swing thereon, means to invert the molds, and means to expand the molds.

2. In a device of the character disclosed, in combination an endless rotary carrier, a plurality of expansible molds mounted to swing thereon, means to fill the same automatically, means to invert the molds, and means to expand the molds for discharge of moulded blocks therefrom.

3. In a device of the character described, in combination a rotary carrier, a plurality of molds mounted to swing in radially disposed vertical planes, said molds being expansible, means to invert the molds, and means to expand the molds for discharge of moulded blocks therefrom.

4. In a device of the character disclosed, in combination rotary carrier, expansible molds carried thereon and adapted to be inverted, a cam to invert the molds, cams to expand the molds while inverted for discharge therefrom, and cams to right the molds.

5. In a device of the character disclosed, in combination a continuously rotary carrier, a plurality of expansible and invertible molds thereon, and means to withdraw the sides of the molds as they are rotated for discharge therefrom.

6. In a device of the character disclosed, in combination a continuously rotary carrier, a plurality of expansible molds thereon, means to fill the molds as they rotate, means to invert the molds, and means to expand the end and side walls of the molds, for discharge while in inverted position.

7. In a device of the character disclosed, in combination, a rotary carrier, a plurality of expansible molds thereon having sides, ends, cores, and bottoms, means to fill the molds, means to invert the molds, means to withdraw the ends and sides, and means to withdraw the cores for discharge while inverted.

8. In a device of the character disclosed, in combination, a rotary carrier, a plurality of expansible molds thereon having sides, ends, cores, and bottoms, means to fill the molds, means to invert the molds, means to withdraw the ends and sides, said cores projecting through said bottoms, means to withdraw the cores for discharge while inverted, said cores being under yielding influence, and means whereby said influence is suddenly released while the molds are inverted to insure dislodgment of the contents.

9. In a device of the character disclosed, in combination, a rotary carrier, a plurality of expansible molds thereon having ends, sides, and bottoms, said molds being mounted to swing radially, means to fill said molds, a cam to invert the molds, cams to withdraw the ends and sides of the molds, and a cam to right the molds.

10. In a device of the character disclosed, in combination, a rotary carrier, a plurality of expansible molds thereon having ends, sides, cores, and bottoms, said molds being mounted to swing radially, means to fill said molds, a cam to invert the molds, cams to withdraw the ends and sides of the molds, cams to withdraw the cores of the molds, and a cam to right the molds, said cores being suddenly releasable by their withdrawing cams while inverted to insure dislodgment of the contents.

11. In a device of the character disclosed, in combination, a rotary carrier, a plurality of expansible molds pivoted thereon, said molds having side and end walls and bottoms, projections on certain of said walls, means to invert the molds, and means to engage said projections to withdraw the walls for discharge of contents.

12. In a device of the character disclosed, in combination, a rotary carrier, a plurality of expansible molds pivoted thereon, said molds having side and end walls, cores, and bottoms, projections on certain of said walls, means to invert the molds, means to engage said projections to withdraw the walls for discharge of contents, and means also to withdraw said cores.

13. In a device of the character disclosed, in combination, a rotary carrier, a plurality of molds carried thereon and adapted to be inverted, means to hold the molds in upright position, means to release said holding means, means to hold the same inverted, means to release the latter holding means, and means to right the molds.

14. In a device of the character disclosed, in combination, a rotary carrier, a plurality of molds carried thereon and adapted to be inverted, means to hold the molds in upright position, means to release said holding means, means to invert the molds, means to hold the same inverted, means to release the latter holding means, means to right the molds, said molds being expansible, and means to expand the molds while inverted for discharge of contents.

15. In a device of the character disclosed, in combination, a rotary carrier having arms, stirrups pivoted between said arms, and molds carried by said stirrups adapted to be inverted.

16. In a device of the character disclosed, in combination, a rotary carrier having arms, stirrups pivoted between said arms, molds carried by said stirrups and adapted to be inverted, means to hold the molds upright, and means to release the holding means for inversion of the molds.

17. In a device of the character disclosed, in combination, a rotary carrier having arms and invertible molds pivoted between said arms, each mold comprising a supporting plate which is connected with the pivots, mold walls carried by said plate, and means engageable with said plate for swinging the mold.

18. In a device of the character disclosed, in combination, a rotary carrier having arms and molds pivoted between said arms, each mold comprising a supporting plate which is connected with the pivots, mold walls carried by said plate, means engageable with said plate for swinging the mold, and releasable means engageable with the plate to hold the mold against swinging motion.

19. In a device of the character disclosed, in combination, a rotary carrier having a mold thereon adapted to be inverted, a latch to hold the mold upright, means to release the latch, and means for inverting the mold upon release.

20. In a device of the character disclosed, in combination, a rotary carrier having a plurality of swinging molds, each mold comprising a pivoted supporting plate, side and end walls pivoted upon said plate and adapted to be swung on their pivots for expansion thereof, and means engageable with certain of said walls for expansion thereof.

21. In a device of the character disclosed, in combination, a rotary carrier having a plurality of swinging molds, each mold comprising a pivoted supporting plate, side and end walls pivoted upon said plate and adapted to be swung on their pivots for expansion thereof, means engageable with certain of said walls for expansion thereof, and spring means for returning said walls.

22. In a device of the character disclosed, in combination, a rotary carrier having a plurality of swinging molds, each mold comprising a pivoted supporting plate, side and end walls pivoted upon said plate and adapted to be swung on their pivots for expansion thereof, means engageable with certain of said walls for expansion thereof, movable cores also carried on said plate, and means engageable therewith for withdrawing the same.

23. In a device of the character disclosed, in combination, a rotary carrier having a plurality of swinging molds, each mold comprising a pivoted supporting plate, side and end walls pivoted upon said plate and adapted to be swung on their pivots for expansion thereof, means engageable with certain of said walls for expansion thereof, movable cores also carried on said plate, and means engageable therewith for withdrawing the same, said cores being spring controlled and suddenly releasable from withdrawn position under influence of the spring control for dislodging contents by jarring the same loose.

24. In a device of the character disclosed, in combination, a rotary carrier having a plurality of swinging molds, each mold comprising a pivoted supporting plate, side and end walls pivoted upon said plate and adapted to be swung on their pivots for expansion thereof, means engageable with certain of said walls for expansion thereof, movable core members mounted to swing with said molds, and means engageable with said cores for moving the same on an expansion of the side and end walls of the molds.

25. In a device of the character disclosed, in combination, a stationary frame, a rotary carrier having a plurality of swinging molds mounted on said frame, each mold comprising a pivoted supporting plate, side and end walls pivoted upon said plate and adapted to be swung on their pivots for expansion thereof, spring controlled means engageable with certain of said walls for expansion thereof, movable core members mounted to swing with said molds, means engageable therewith for partially withdrawing the same, and means connected to said frame for imparting a jar to each set of mold cores for dislodging the mold blocks from the molds.

26. In a device of the character disclosed, in combination, a rotary carrier having a plurality of swinging molds thereon, each mold comprising a pivoted supporting plate, side and end walls carried upon said plate, cores carried by said plate, a withdrawing bar connected with said cores, and means engageable with said bar for withdrawing the latter.

27. In a device of the character disclosed, in combination, a rotary carrier having a plurality of swinging molds thereon, each mold comprising a pivoted supporting plate, side and end walls carried upon said plate, cores carried by said plate, a withdrawing bar connected with said cores, means engageable with said bar for withdrawing the latter, and springs bearing against said plate and influencing said bar and cores and adapted to be tensioned when the bar is withdrawn.

28. In a device of the character disclosed, in combination, a rotary carrier having a plurality of swinging molds thereon, each mold comprising a pivoted supporting plate, side and end walls carried upon said plate, a bottom carried by said plate, cores projecting through said bottom, a withdrawing bar connected with said cores, means engageable with said bar for withdrawing the latter, and springs bearing against said plate and influencing said bar and cores and adapted to be tensioned when the bar is withdrawn, the bar being suddenly releasable to produce a jar for dislodging contents from the mold.

29. In a device of the character disclosed, in combination, a rotary carrier having a plurality of swinging molds thereon, each mold comprising a pivoted supporting plate, side, end and bottom walls carried upon said plate, cores carried by said plate, a withdrawing bar connected with said cores, means engageable with said bar for withdrawing the latter, springs bearing against said plate and influencing said bar and cores and adapted to be tensioned when the bar is withdrawn, said side and end walls being movably mounted upon the plate for expansion thereof, and means engageable therewith to expand the same when said cores are withdrawn.

30. A mold comprising a supporting plate, means to mount the same for rotation, the end and side mold walls and cores movable automatically mounted upon said plate.

31. A mold comprising a supporting plate, means to mount the same, end and side molds walls movably mounted upon said plate, cores movably mounted on said plate, certain of said walls being connected by springs, and toggle connections between said certain walls and other walls for moving the walls to position.

32. A mold comprising a supporting plate, means to mount said plate for continuous rotation, mold walls automatically movable mounted on said plate for expansion of the mold prior to an ejectment of the molded article, means on certain of said mold walls adapted to be engaged to automatically move the walls to one position, and means on said walls for automatically returning the same.

33. A rotary mold comprising a supporting plate, automatically movable end and side walls connected therewith, a bottom wall mounted thereon, and automatically movable cores projecting through said bottom carried on the plate.

34. A mold comprising a supporting plate, end, side and bottom walls mounted thereon, bottom wall cores projecting through said bottom wall and movably mounted on said plate, and springs normally spacing said cores from said plate.

35. A mold comprising a supporting plate, end and side walls mounted thereon, a bottom wall mounted thereon, cores movably mounted on said plate, springs normally spacing said cores from said plate, and a withdrawing bar connected with said cores having portions adapted to be engaged for withdrawing said cores toward said plate against said springs.

36. A mold comprising a supporting plate, end and side walls movably mounted thereon for expansion of the mold, means to return said walls, a bottom wall carried by said plate, cores projecting through said bottom and movably mounted on said plate, springs normally urging said cores from said plate into cooperative relation with said side and end walls, and a withdrawing member connected with said cores having portions adapted to be engaged for withdrawing said cores against said springs for expansion of the mold.

37. A rotary mold comprising a supporting member, end, side and bottom walls mounted on said member, certain of said walls being automatically movable with respect thereto, and resilient means for automatically moving said walls to position.

38. A rotary mold comprising a supporting member, end, side and bottom walls mounted on said member, certain of said walls being automatically movable with respect thereto, resilient means for moving said walls to position during the rotation of said mold, and means on certain of said side and end walls adapted to be engaged for automatically moving said walls from said position.

39. A mold comprising a supporting member, rotary mold walls pivotally mounted on said member, means for automatically moving said walls, and means for mounting said member for movement, said member having an extension beyond certain of said walls adapted to be engaged for moving the member with its walls.

40. In a device of the character disclosed, a continuously rotary carrier having a plurality of molds thereon, means for spraying the inner walls of the molds with lubricant, and means upon the carrier for automatically operating the spraying device as each mold passes the same.

41. In a device of the character disclosed, a rotary carrier having a plurality of molds mounted thereon adapted to be inverted, means for inverting said molds, means for spraying the molds while inverted, and means automatically actuable by the carrier as each mold passes for setting the spraying means in operation.

42. In a device of the character disclosed, a rotary carrier having a plurality of expansible molds adapted to be inverted, means for inverting the molds, means for expanding the molds, means for applying lubricant to the inner walls of the molds while inverted and expanded, and means on the carrier for actuating the lubricant applying means as each mold passes.

43. In a device of the character disclosed, a continuously rotary carrier having a plurality of expansible molds adapted to be inverted, means for inverting the molds, means for expanding the molds, means for spraying lubricant on the inner walls of the molds while inverted and expanded, and means on the carrier for actuating the spraying means as each mold passes.

In witness that we claim the foregoing we have hereunto subscribed our names this 9th day of May, 1925.

ERNEST J. BENSON.
CARL F. WESTBERG.
CARL W. FERNHOLTZ.
EMIL FERNHOLTZ.